United States Patent [19]

Jaulmes

[11] 4,248,322

[45] Feb. 3, 1981

[54] SECURITY DEVICE FOR FUEL TANK CAP OF A TWO-WHEELED VEHICLE

[75] Inventor: Christian Jaulmes, Paris, France

[73] Assignee: Ateliers de la Motobecane, Pantin, France

[21] Appl. No.: 40,225

[22] Filed: May 18, 1979

[30] Foreign Application Priority Data

Sep. 5, 1978 [FR] France .................................. 78 25479

[51] Int. Cl.³ .......................... B60R 25/00; B62H 5/00
[52] U.S. Cl. ...................................... 180/287; 70/233; 74/483 K
[58] Field of Search ............... 180/218, 271, 286, 287, 180/289; 280/5 R, 5 A; 70/164, 170, 233, 244, 258, 215; 74/483 K

[56] References Cited

U.S. PATENT DOCUMENTS

| 2,625,813 | 1/1953 | Hinds | 70/233 |
| 3,704,606 | 12/1972 | Russek | 70/164 |

FOREIGN PATENT DOCUMENTS

| 445013 | 2/1945 | Italy | 70/164 |
| 438906 | 8/1948 | Italy | 70/215 |

Primary Examiner—John J. Love
Assistant Examiner—Randall A. Schrecengost
Attorney, Agent, or Firm—Browdy and Neimark

[57] ABSTRACT

A security device for a fuel tank of a two-wheeled vehicle having a front fork, which can be locked in a position while it forms an angle other than 180° with respect to the longitudinal plane of symmetry of the vehicle. The device includes a fuel tank cap provided with one or more notches therein. An elongated member, which is fixed on the fork, is so positioned with respect to the cap that when the fork is in its locked position, the member is in one or another of the notches. The result is that when the fork is in the locked position, the fuel tank cap cannot be unscrewed. The notch or notches are formed in the upper surface of the cap and extend to the periphery thereof.

6 Claims, 3 Drawing Figures

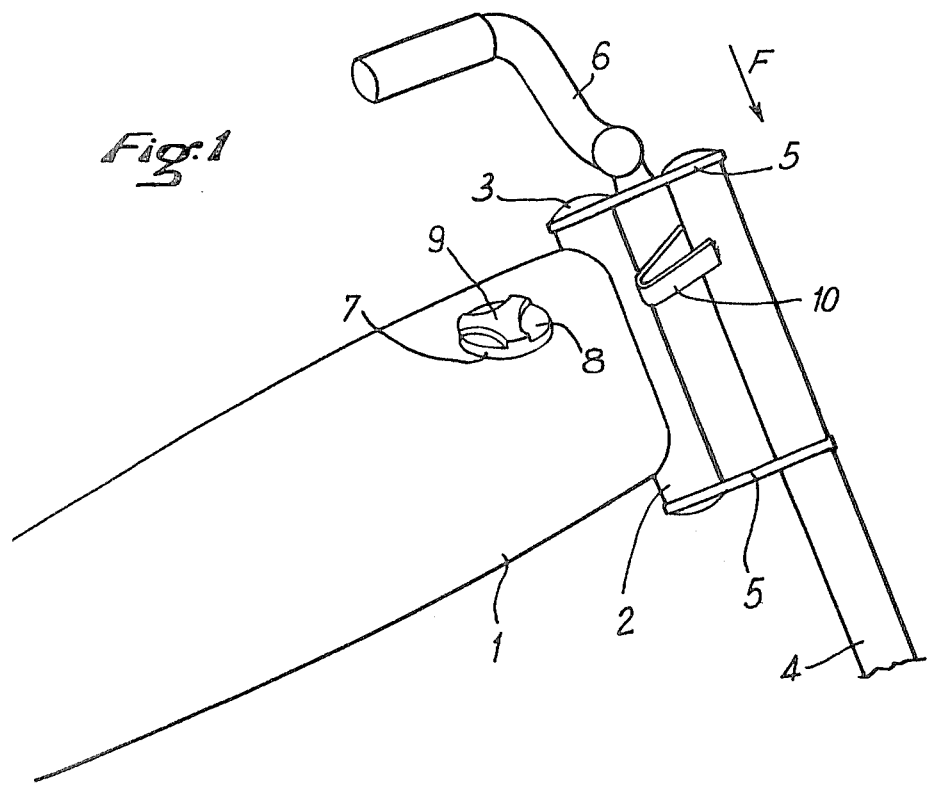
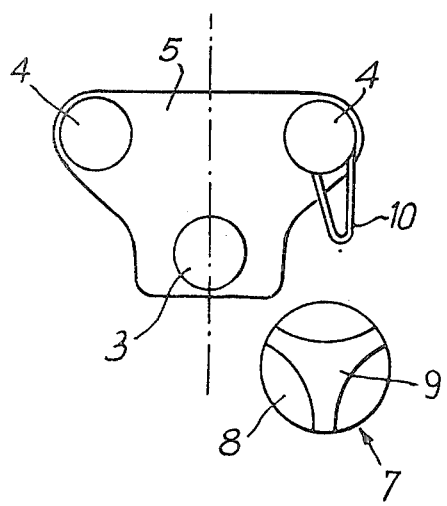
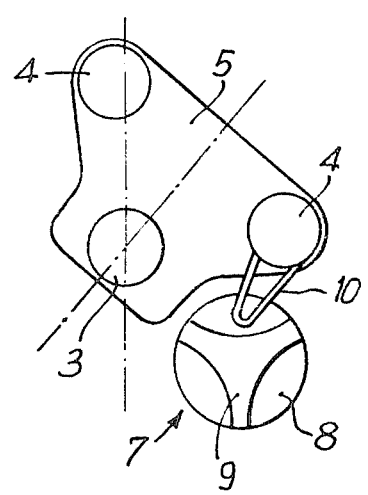

SECURITY DEVICE FOR FUEL TANK CAP OF A TWO-WHEELED VEHICLE

BACKGROUND OF THE INVENTION

This invention relates to a security device for the fuel tank cap of a two-wheeled vehicle and, more particularly, to such devices which do not need separate locks and keys.

Caps for fuel tanks are known which are provided with a lock that can be locked with a key, but these security devices have the drawback of requiring a second lock, a first lock being generally already used as an antitheft device for the vehicle itself. This results in considerable cost and the need for the user of the vehicle to have two keys if the two locks are different, which is generally the case.

SUMMARY OF THE INVENTION

It is the object of the present invention to provide a security device for the fuel tank cap of two-wheeled vehicles of the type which includes a tank beam and a front fork able to be locked in a position where it forms an angle in relation to the longitudinal plane of symmetry of the vehicle.

For this purpose, the device of the present invention provides that the fuel tank cap is a cap which can be locked by rotation and is provided on its outside major surface with at least one notch. A member which is fixed to the fork is so positioned thereon that it will go into the notch when the fork is in its locked position.

Consequently, when the vehicle is left with its fork locked to prevent it from being stolen, the member fixed to the fork, engages in the notch of the tank cap so that the latter is immobilized against rotation thereof and consequently cannot be unscrewed.

In an embodiment of the invention, the notch is formed by a rib made on the upper surface of the cap.

Preferably, the cap includes a plurality of notches distributed on its upper surface in the vicinity of its pheriphery.

This arrangement makes it possible to increase the number of positions in which the cap and member fixed to the fork, can function together so that it is generally not necessary to place the cap in a predetermined angular position before locking the fork to additionally secure the fuel tank.

BRIEF DESCRIPTION OF THE DRAWINGS

In any case the invention is to be best understood from the following specification and accompanying drawings, given by way of non-limiting example of an illustrative embodiment. In the accompanying drawings:

FIG. 1 is a side view of a portion of the two-wheeled vehicle provided with a security device for a fuel tank cap according to an exemplary embodiment of the present invention.

FIG. 2 is a view along the arrow F of FIG. 1, the device being in its unlocked position.

FIG. 3 is a view similar to that of FIG. 2, the device being illustrated in its locked position.

DETAILED DESCRIPTION OF THE PREFERRED EMBODIMENT

The drawings represent a motor-assisted pedal cycle of known type. The frame of the vehicle includes a beam 1, which also serves as a fuel tank and a supporting tube 2. The tube 2 contains a shaft 3 of the front fork of the vehicle. This fork is constructed of two tubes 4 connected to the shaft 3 by two fork plates 5, the upper plate 5 being made to support handlebars 6 of the motor-assisted pedal cycle.

The fuel tank is provided in its upper portion with a filling orifice closed in a conventional manner by a screw cap 7.

In accordance with the present invention, the cap 7 is provided with three notches 8 formed by ribs 9 on the upper surface of the cap 7, the notches 8 extending to the periphery thereof. The notches 8 are made to function with a member 10 formed in this case of sheet metal bent in the form of a V and welded to one of the tubes 4 of the fork of the vehicle.

FIG. 2 shows that, when the fork is symmetrical to the longitudinal axis of the vehicle, the cap 7 is not locked and can be unscrewed to provide access to the fuel tank formed by the beam 1. On the other hand, when the fork is turned to the right and locked in the position shown in FIG. 3, for example, by a lock located in a housing fixed to the fork, the member 10, which is fixed to one of the tubes 4, engages in one of the notches 8 so that the cap 7 cannot be unscrewed and consequently cannot be removed. The ribs 9 are made to be sufficiently resistant not to be able to be forced, but still have a slight enough width, especially on the periphery of the cap 7, for the member 10 to be able to engage in one of notches 8 in most angular positions of the tank cap 7. The member 10 can readily take other forms such as a pin or tapered solid member.

The foregoing description and accompanying drawing relate to a preferred embodiment and variants thereof and have been given by way of example, not by way of limitation. Numerous other embodiments and variants are possible without departing from the spirit and scope of the invention, its scope being defined by the appended claims.

What is claimed is:

1. A security device for a fuel tank of a two-wheeled vehicle having a front fork which can be locked in a position where it forms an angle with respect to the longitudinal plane of symmetry of the vehicle, the device comprising a fuel tank cap provided with at least one notch which extends from its upper surface to a surface thereof below said upper surface and distinct from periphery surfaces of the cap, and an elongated member fixed to and immoveable with respect to said fork, and positioned with respect to said cap and its said upper surface so that when said fork is in its locked position said member which is immoveable with respect to said fork is in said notch.

2. A security device according to claim 1, wherein said at least one notch is in the upper surface of said cap.

3. A security device according to claim 1 or claim 2, wherein said notch is formed by a rib on the upper surface of said cap.

4. A security device according to claim 1 or claim 2, wherein said at least one notch comprises a plurality of notches distributed in the upper surface of said cap.

5. A security device according to claim 4, wherein said notches extend to the periphery of said cap.

6. A security device according to claim 5, wherein said member is formed of sheet metal welded onto said fork.

* * * * *